May 27, 1969 — A. H. WEIERTZ — 3,446,513
STABILIZING SUSPENSION FOR A PAIR OF
STEERABLE ROAD WHEELS OF AUTOMOBILES
Filed May 29, 1967

INVENTOR
AXEL HUGO WEIERTZ
ATTORNEYS

United States Patent Office 3,446,513
Patented May 27, 1969

3,446,513
STABILIZING SUSPENSION FOR A PAIR
OF STEERABLE ROAD WHEELS OF
AUTOMOBILES
Axel Hugo Weiertz, Bellevuevagen 24,
Malmo, Sweden
Filed May 29, 1967, Ser. No. 641,763
Int. Cl. B62d; B60g; B60p
U.S. Cl. 280—96.2                                8 Claims

ABSTRACT OF THE DISCLOSURE

In an automobile there is arranged between the steering knuckle of a steerable road wheel and the automobile frame a link which transmits to the steering knuckle a force actuating the steering of the road wheel in dependence on the momentum of the frame and load thereon.

---

This invention relates to a stabilizing suspension for a pair of steerable road wheels of automobiles.

Among the accidents now increasingly occurring on the roads there are such as are never fully explainable even to the police and the automotive experts who investigate the circumstances resulting in the accident. Accidents of this type are those in which a car on a straight and apparently smooth road when moving at high though not extremely high speed suddenly deviates from its straight forward course and turns to the other side of the road hitting a car coming from the opposite direction, or runs off the road hitting obstacles in the surroundings. In such cases severe crashes arise and the persons riding in the car or cars are killed or seriously injured. Accidents of this kind generally are "explained" by experts to be due to the human factor, the driver fell asleep or without reason suddenly changed his course, or to a non-realized technical fault in the car though no evidence is put forth to sustain such explanations.

I submit that the fatal accidents related above where a car gets out of control and smashes into another car, a tree etc. to a substantial extent are due to an inherent insufficiency in the construction of the steering system of modern motor cars that has not been taken into consideration by the car designers. Below I will explain this assertion more in detail.

Unevenness of the road surface and also varying friction coefficients of the road surface at different sections thereof may cause the front wheels of a car, controlled by the steering mechanism, to flutter or turn by impulses from the road. Having noticed these undesirable angular movements of the front wheels of a car, I have studied the front wheel geometry in order to find out the reason why the excessive angular movements of the front wheels occur under certain circumstances beyond the control of the driver and I have found that the value of the lead of the front wheels is a major factor affecting the stability of the front wheels when the motor car is running at reasonably high and very high speeds. In modern cars having independently suspended front wheels there is provided no or very small lead of positive or even zero or small negative caster angles. However, it is established in the art that great lead makes the steering of the car more distinct but also heavier, at the same time making the car more sensitive to sudden lateral wind gusts. On the other hand, a small lead provides an easier steering of the car and better stability with regard to wind gusts but makes the front wheels more sensitive to unevennesses of the road surface, which leads to the fluttering and the externally initiated angular movements of the front wheels as recited above. However, in modern motor cars the angular movements of the front road wheels thus caused are prevented from reaching the steering wheel by the provision of elastically yielding connections such as rubber bushings. The more comfortable driving thereby achieved by the modern design of the steering mechanism of modern motor cars therefore is a chimera giving the driver the feeling of safe driving and keeping him unaware of the uncontrolled movements effected by the front wheels though not transmitted to him.

Now, the matter of steering control is contingent upon the road wheels maintaining a close and intimate contact with the road surface. Such intimate contact may be disturbed by unevenness of the road, protuberances and cavities in the road surface causing the road wheels at least partly to lose their friction engagement with the road surface. This is especially true in winter when the roads are in a slippery state decreasing the road wheel friction engagement with the road surface to an extremely low value. This means that also the undesirable uncontrolled angular movements of the front wheels decrease the friction engagement between the road wheels and the road surface, but in general the road friction will not be sufficiently low to permit the car to get out of control. However, in my opinion this will be the case under specific circumstances and will lead to an extremely dangerous driving condition. If e.g. both front wheels simultaneously strike against protuberances, even small ones, in the road surface, something that is likely to occur even on the modern roads having a smooth hard surface, both front wheels may be caused to turn due to the sudden shock at both wheels causing them to lose their friction engagement with the road surface necessary to keep the car under the driver's control by the movements transmitted to the road wheels through the steering mechanism. Also, if in winter one wheel is running into a rough strip of frozen ice-slush usually appearing at the edge or border of the road, the other front wheel still being on a smooth but slippery part of the road, the total friction between the front wheels and the road surface may suddenly be so low that the car gets out of control without any possibility for the driver to overcome the uncontrolled condition of the car. Therefore, I maintain that the apparently comfortable, but actually unsafe and dangerous condition at reasonably high and very high speeds as recited above is the reason for the accidents where the car suddenly and expectedly gets out of control and that such condition is inherently connected with most modern cars due to the constructive features included therein and considered customary in the art. No uncontrolled movements of the road wheels are felt by the driver through the steering system as they are absorbed by the yieldable elements incorporated in such system but such movements are still at the wheels and may reach such magnitude as results in an uncontrolled movement of the car which suddenly occurs to the driver giving him no possibility of getting the car under control before it is too late and an accident happens.

In order to overcome the deficiencies of steering mechanisms now commonly used there is provided according to the invention in an automobile having a frame structure, a pair of steerable wheels and a wheel support on said frame structure for each of said wheels, the combination comprising a first braking means mounted for rotation together with each of said wheels, a second braking means engageable with said first braking means, mounting means mounting said second braking means on said wheel support for oscillating movement relative to said first braking means, an arm on said mounting means directed rearwardly therefrom, and link means between said frame structure and said arm for transmitting to said arm the weight of said frame structure and load supported thereby as a variable force actuating the steering of said wheels in dependence on the momentum of said frame structure and the load thereon, said link means forming a yieldable abutment for said mounting means.

For better elucidation the invention and the advantages gained thereby will be described more in detail in the following, reference being had to the accompanying drawings in which.

Figure 1:
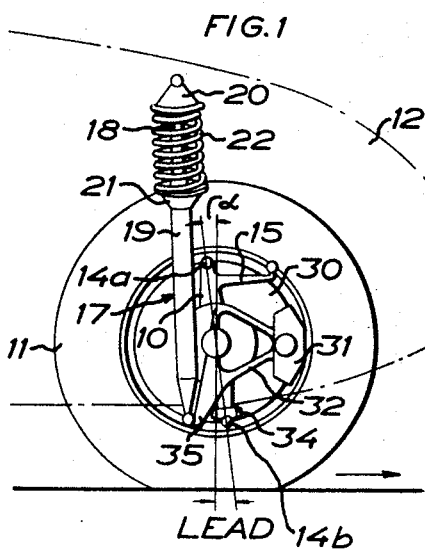
FIG. 1 is a schematic side elevational view of one individually supported steerable front wheel of an automobile, as seen from a central longitudinally vertical plane through the automobile, the stabilizer according to the invention being provided for said front wheel.

The automobile on each side has a wheel support comprising a steering knuckle 10 with a road wheel 11 journaled thereon which is connected to the chassis frame 12 of the automobile by means of upper and lower control arms 13 pivoted on substantially longitudinal axes and connected to the steering knuckle 10 by upper and lower ball joint connections 14a and 14b, respectively. The road wheels are steerable by means of a conventional mechanical steering mechanism which includes a steering link arm 15 provided on the steering knuckle 10, said steering link arm being connected by a steering link to the conventional steering gear controlled by the steering wheel.

Connected to wheel 11 for rotation therewith is a first braking means with a circular braking disk 30 coaxial with the rotational axis of the wheel. A second braking means with a clamp type braking mechanism 31 of conventional design includes braking pads engageable with opposite sides of disk 30 and is operable in a known manner by hydraulic operating means against spring biasing means not shown in the drawing. The braking mechanism is supported by a mounting means 32 which is pivotally mounted on a stub shaft 33 provided on said steering knuckle and coaxial with the rotational axis of wheel 11. Preferably the bearing for mounting means 32 on stub shaft 33 is provided with a self lubricating impact resistant bushing 33a. As is understood the main load on such bearing is transmitted to the bearing by the vehicle suspension system. The only pivotal movement in the bearing is one arising by the braking of the wheel as will be described herein later on. Rotation of mounting means 32 is limited to a fraction of a full revolution by connecting means between said mounting means and the wheel support, said connecting means comprising an abutment 34 provided on steering knuckle 10, said abutment being engaged by said braking mechanism 31 at one end of said fraction, an arm 35 formed on and directed rearwardly from the mounting means 32 engaging abutment 34 at the other end of said fraction. Abutment 34 thus is engaged by opposed surfaces on braking mechanism 31 and arm 35 on opposite sides and preferably is provided with cushioning pads contacting the engaging members. Rotational movement of mounting means 32 is restrained by a frictional layer 36 made of a yieldable material such as rubber and coated with a friction material, said layer being clamped between a conical member 37 on steering knuckle 10 and a complementary conical member 38 on mounting means 32 pivoted on stub shaft 33, by a screw clamp member 39 engaging stub shaft 33.

An additional and substantially greater restrainment on pivotal movement of mounting means 32 is provided by link means in the form of a spring biased strut 17 arranged between a stationary abutment 16 on the frame structure 12 and arm 35 on each side of the car, said strut 17 incorporating also double acting shock absorbing means. Strut 17 is connected with abutment 16 and arm 35 by ball joints or other universal joints said arm being directed rearwardly and being disposed inwardly of the pivot axis (king pin) of said steering knuckle as defined by said ball joint connections 14a and 14b. In a manner known per se strut 17 includes two telescopically arranged tubular elements 18 and 19 each being provided with a cup-shaped circumferential outer flange 20 and 21, respectively, and a coil spring 22 surrounding element 18 and abutting said flanges 20 and 21 at its ends. Thus, elements 18 and 19 may be pushed together more or less against the force of spring 22. As mentioned, strut 17 also forms a shock absorber, element 18 being provided with a restricted opening in an end wall at the inner end thereof allowing controlled passage of hydraulic fluid contained in said elements 18 and 19 from one side of end wall to the other side of such wall from the interior of one element to the interior of the other element, and vice versa. As is appreciated the special form of the shock absorbing feature constitutes no part of the present invention as other shock absorber constructions may be suitable for use in the strut provided according to the invention.

Considering now the steering geometry of the front wheel suspension shown in the drawing and described above it will be noted that each front wheel has a caster angle $\alpha$ setting up a lead since the vertical center line of the wheel is placed behind the center line of the pivot axis or king pin of the knuckle as shown in FIG. 1. It is known that a caster angle providing great lead will make the steering of the car heavy to the driver but on the other hand such great lead will make the running of the car more stable without tendency of the car to dive violently from one side to the other. Such diving may be minimized or even eliminated by the specific design of the front wheel suspension according to the invention.

Figure 2:
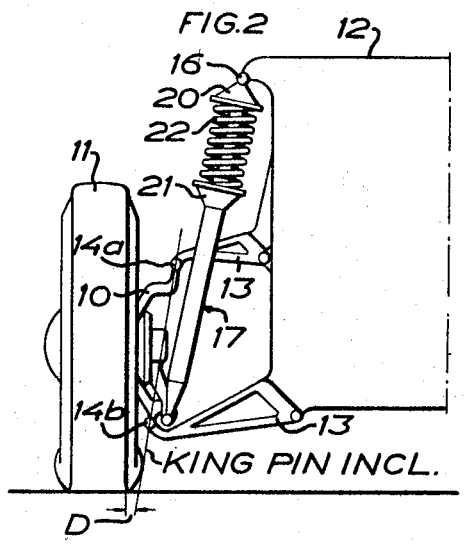
FIG. 2 is a schematic view of the arrangement of FIG. 1, as seen from the driver's seat.

The king pin inclination is illustrated by FIG. 2 in the drawings and it is noted that the king pin inclination in the front wheel suspension disclosed herein places the turning point not at the center of the tire tread as usually is the case but instead inside the wheel and, in fact, at a distance D therefrom. Such king pin inclination no doubt makes the steering less stable than a king pin inclination placing the turning point at the center of the tire tread, as there is a tendency of the wheel to swing around the king pin when it strikes a bump. Again, this undesirable tendency is eliminated by the specific steering geometry and front wheel suspension proposed according to the invention. In this connection it should be noted that a greater distance between the turning point of the front wheel and the center of the tire provides an easier turning of the wheels when the car is at rest.

Considering the front wheel suspension of the invention it is assumed that no braking forces are applied on braking disk 30 by braking mechanism 31, the weight of the car being transmitted to the front wheels by struts 17 only acting on the respective arms 35. Arm 35 contacts abutment 34 on steering knuckle 10 in a condition of rest under the circumstances related with the brakes disengaged. Now, each strut 17 is inclined to the vertical and according to the invention it should be arranged at a greater angle to the vertical than the king pin in order that a steering force may be transmitted to the steering knuckle. As is appreciated when the front wheels are in a position for straight forward movement of the car no force is applied to the front wheels to cause them to turn as the forces from struts 17 on both sides of the car neutralize each other. The risk for sudden great uncontrolled turning of the wheels on account of external forces acting thereon e.g. caused by bumps in the road may be minimized or even eliminated by the possibility to choose a great lead. Further, fluttering of the wheels is spontaneously absorbed directly at the wheels by the shock absorbing struts without possibility to be transmitted to the steering gear, making the driving comfortable to the driver. Struts 17 also give steering aid when the car passes through turns. In a curve one of the struts viz the strut on the outer side of the curve is heavier loaded with the weight of the car than the other strut on the other side on account of the centrifugal force and thus there is provided on the outer steering knuckle a force that assists the steering force, the force provided by the strut on the steering knuckle on the other side of the car at the same time being partially relieved. Thus, it is compensated for the heavier steering provided by the greater lead by the steering aid achieved by the struts. The transverse distance between the ball joints on abutments 16 should be less than the transverse distance between the ball joints of the struts on arms 35 (in general this is the case on account of the king pin inclination) to obtain automatically the greater force that is necessary to turn the wheels the narrower the curve is. This depends on the fact that the inclination of the strut 17 on the outer side of the curve will change with the turning of the wheels to a position including a greater angle to the vertical. Thus, the force applied by the strut will have a greater horizontal component for a greater wheel angle than for a smaller one.

Figure 3:
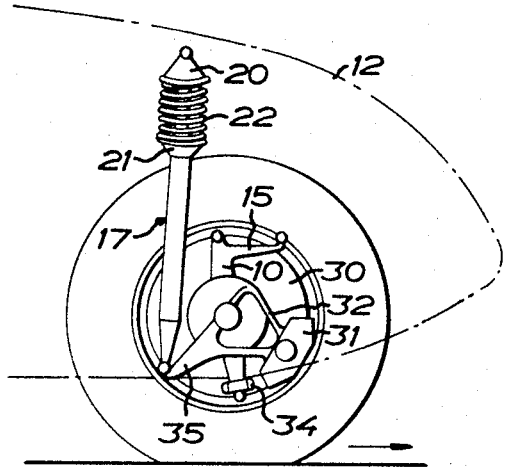
FIG. 3 is a view according to FIG. 1 illustrating the conditions during braking of the wheel.
Figure 4:
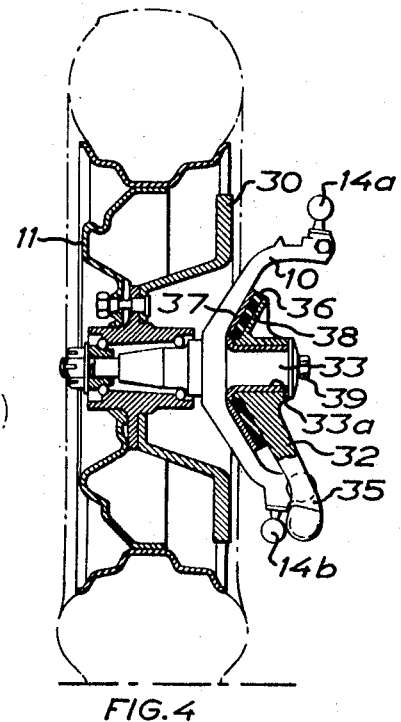
FIG. 4 is an enlarged axial sectional view of the wheel and the wheel knuckle illustrating the constructive details thereof.

The front wheel suspension according to the invention also provides a supplementary balancing action when the front wheels are braked so as to avoid that differential braking forces on said wheels jeopardize the manual control of the steerable wheels. Considering the conditions when braking the vehicle automatic supplementary corrective effect on the steerable wheels is provided by strut 17 connected with mounting member 32 at arm 35. When braking mechanism 31 is engaged with braking disk 30 the friction force acting between mechanism 31 and disk 30 is transmitted to strut 17 via mounting member 32 and arm 35. Spring 22 inclined in strut 17 forms a yieldable support for arm 35, having an effective lever with regard to the pivot axis of knuckle 10 (king pin) which is variable being larger as the effective braking action is increased and arm 35 thereby is moved away from abutment 34 as is shown in FIG. 3. The outwardly directed increasing resultant force on knuckle 10 provided thereby and augmented by other forces emanating from the braking such as deceleration forces (momentum) from the car, acting through strut 17 and spring 22 included therein as well as forces from arms 13 connecting the knuckle 10 with the frame structure, may be adjusted so as to achieve a neutralizing effect on the oppositely directed force acting on the knuckle around the pivot axis thereof when braking the wheel, and emanating from the frictional force between the road wheel and the road surface. Said latter force has an average lever the length of which equals half the wheel width+D.

It has been found that the braking system as described provides a substantially shorter braking distance than commonly used braking systems under equivalent conditions. This may be explained as follows:

The wheel pressure against the road surface is increased momentarily when the brake is engaged since the increased pressure acting on spring 22 of strut 17 from the lower end of said spring is transmitted to the frame structure and the body supported thereby representing a great momentum. As explained above member 32 of braking mechanism 31 is yielding on account of spring 22, which means that variations in the frictional force between the road wheel and the road surface are gently absorbed by said spring. Thereby the road wheel will continue to roll on the road surface without sliding at normal braking. At hard braking the braking distance may be substantially shortened since the changing between high and low road friction conditions when the wheel is about to slide (locking between braking mechanism 31 and braking disk 30) provides an oscillating movement of mounting member 32 of braking mechanism 31 delaying locking between the braking mechanism and the braking disk. On account of interaction between the vehicle suspension system and the mounting member 32 it is difficult for the braking pads of the braking mechanism to come to rest, the pads thereby not being allowed to lock the braking disk which is a pre-requisite for the sliding of the road wheel on the road surface. It will be noted that there is the possibility to positively oscillate mounting member 32 by providing means transmitting to member 32 impulses from the vehicle or the road.

In the steerable wheel suspension system described arms 13 connecting knuckle 10 with frame structure 12 are relieved of direct braking forces by strut 17 and have to transmit substantially only decelerating forces, the caster thereby being maintained unchanged and so is lead. On account of the continuously gentle braking action which is independent of sudden engagement of the brake and changing road conditions the road contact of the wheel will not be disturbed and the steering stability of the vehicle thereby will be favourably influenced.

It will be noted that braking mechanism 31 when the vehicle is moving in reverse (in a direction opposite to that marked by arrows in the drawing) will have no yielding support as arm 35 bears against abutment 34. This means that the vehicle may be started to move on an upwardly inclining road with the brake initially engaged more easily and gently on account of the fact that arm 35 will leave abutment 34 when the car begins to move before braking mechanism 31 has been disengaged from braking disk 30.

It is appreciated that the steering geometry of the front wheel suspension according to the invention is dependent on the particular car in which the invention is used, no numerical values therefore can be given for the designer's guidance. The directions and levers of all component forces should be adjusted so as to achieve a floating balanced condition of braking mechanism 31 at full braking action and maximum road friction during normal forward speeds without braking mechanism 31 reaching abutment 34, as shown in FIG. 3. This abutment should be reached only at full braking action and at a vehicle speed that is close to zero. However, the invention is not limited to specific numerical values or even ranges of values but is concerned with the novel arrangement of strut 17 transmitting the weight of the car directly to the steerable front wheels and stabilizing the movements of such wheels when driving the car straight ahead or through curves and when braking the car.

What I claim and desire to secure by Letters Patent is:

1. In an automobile having a frame structure, a pair of steerable wheels and a wheel support on said frame structure for each of said wheels, the combination comprising a first braking means mounted for rotation together with each of said wheels, a second braking means engageable with said first braking means, mounting means mounting said second braking means on said wheel support for oscillating movement relative to said first braking means, an arm on said mounting means directed rearwardly therefrom, and link means between said frame structure and said arm for transmitting to said arm the weight of said frame structure and load supported thereby as a variable force actuating the steering of said wheels in dependence on the momentum of said frame structure and the load thereon, said link means forming a yieldable abutment for said mounting means.

2. The combination as claimed in claim 1 in which said link means comprises an elastically yieldable strut universally connected at its ends to said frame structure and said arm.

3. The combination as claimed in claim 1 in which said mounting means comprises connecting means between said mounting means and said wheel support allowing for limited movement of said mounting means in relation to said wheel support elastically restrained by said connecting means.

4. The combination as claimed in claim 3 in which said wheel support and said mounting means form opposed surfaces, said connecting means comprising at least one elastically yieldable block between said surfaces.

5. The combination as claimed in claim 3 in which said wheel support comprises a stationary abutment limiting the movement of said mounting means during the load imposed thereon by said link means.

6. The combination as claimed in claim 1 in which said link means comprises shock absorbing means forming a strut between said frame structure and said arm.

7. The combination as claimed in claim 6 in which said strut is inclined to the vertical at an angle which is greater than the angle of the king pin inclination of said wheel support.

8. The combination as claimed in claim 7 in which the king pin inclination defines a turning point of each of said wheels which is disposed inside the wheel.

References Cited

UNITED STATES PATENTS

| 2,471,956 | 5/1949 | Holl | 188—18 |
| 2,623,613 | 12/1952 | Booth | 188—18 |
| 3,133,744 | 5/1964 | Weiertz | 280—96.2 |
| 3,326,333 | 6/1967 | Rockwell | 188—18 |

KENNETH H. BETTS, *Primary Examiner.*

U.S. Cl. X.R.

188—18; 267—20